(12) United States Patent
Kolder et al.

(10) Patent No.: US 10,955,196 B2
(45) Date of Patent: Mar. 23, 2021

(54) SUPERCHARGED AIR COOLING APPARATUS

(71) Applicant: Hanon Systems, Daejeon (KR)

(72) Inventors: Petr Kolder, Roznov Pod Radhostem (CZ); Jan Povysil, Prerov (CZ); Martin Sopuch, Novy Jicin (CZ); Milan Chytry, Novy Jicin (CZ)

(73) Assignee: HANON SYSTEMS, Daejeon (KR)

( * ) Notice: Subject to any disclaimer, the term of this patent is extended or adjusted under 35 U.S.C. 154(b) by 111 days.

(21) Appl. No.: 15/751,351

(22) PCT Filed: Jan. 10, 2017

(86) PCT No.: PCT/KR2017/000328
§ 371 (c)(1),
(2) Date: Feb. 8, 2018

(87) PCT Pub. No.: WO2017/122987
PCT Pub. Date: Jul. 20, 2017

(65) Prior Publication Data
US 2018/0306520 A1 Oct. 25, 2018

(30) Foreign Application Priority Data
Jan. 11, 2016 (DE) ............ 10 2016 100 305.0

(51) Int. Cl.
*F28D 9/00* (2006.01)
*F28F 21/06* (2006.01)
(Continued)

(52) U.S. Cl.
CPC ........... *F28D 9/0043* (2013.01); *F02B 29/04* (2013.01); *F02B 29/0462* (2013.01);
(Continued)

(58) Field of Classification Search
CPC ....... F28D 9/0043; F28F 9/0246; F28F 9/005; F28F 9/0075; F28F 9/0043; F28F 21/067; F28F 3/10; F02B 29/0462; F02B 29/04
See application file for complete search history.

(56) References Cited

U.S. PATENT DOCUMENTS 9,038,610 B2   5/2015 Meshensky et al.
2003/0000688 A1* 1/2003 Mathur ............... F28D 9/0006
                                                    165/167
(Continued)

FOREIGN PATENT DOCUMENTS

CN        87201483 U    3/1988
CN        201383909 Y   1/2010
(Continued)

OTHER PUBLICATIONS

The First Chinese Office Action dated Jul. 17, 2019; Appln. No. 201780003274.8.
(Continued)

*Primary Examiner* — Tho V Duong
(74) *Attorney, Agent, or Firm* — McLean IP Global; Jason Y. Pahng

(57) ABSTRACT

The invention, which relates to a device for charge-air cooling, has as its objective to specify a device that can be produced simply and cost-effectively and that ensures reliable functionality. This task is resolved according to the invention thereby that the housing comprises a capping that closes off the housing in which is disposed an inflow and an outflow.

9 Claims, 6 Drawing Sheets

Figure 1:
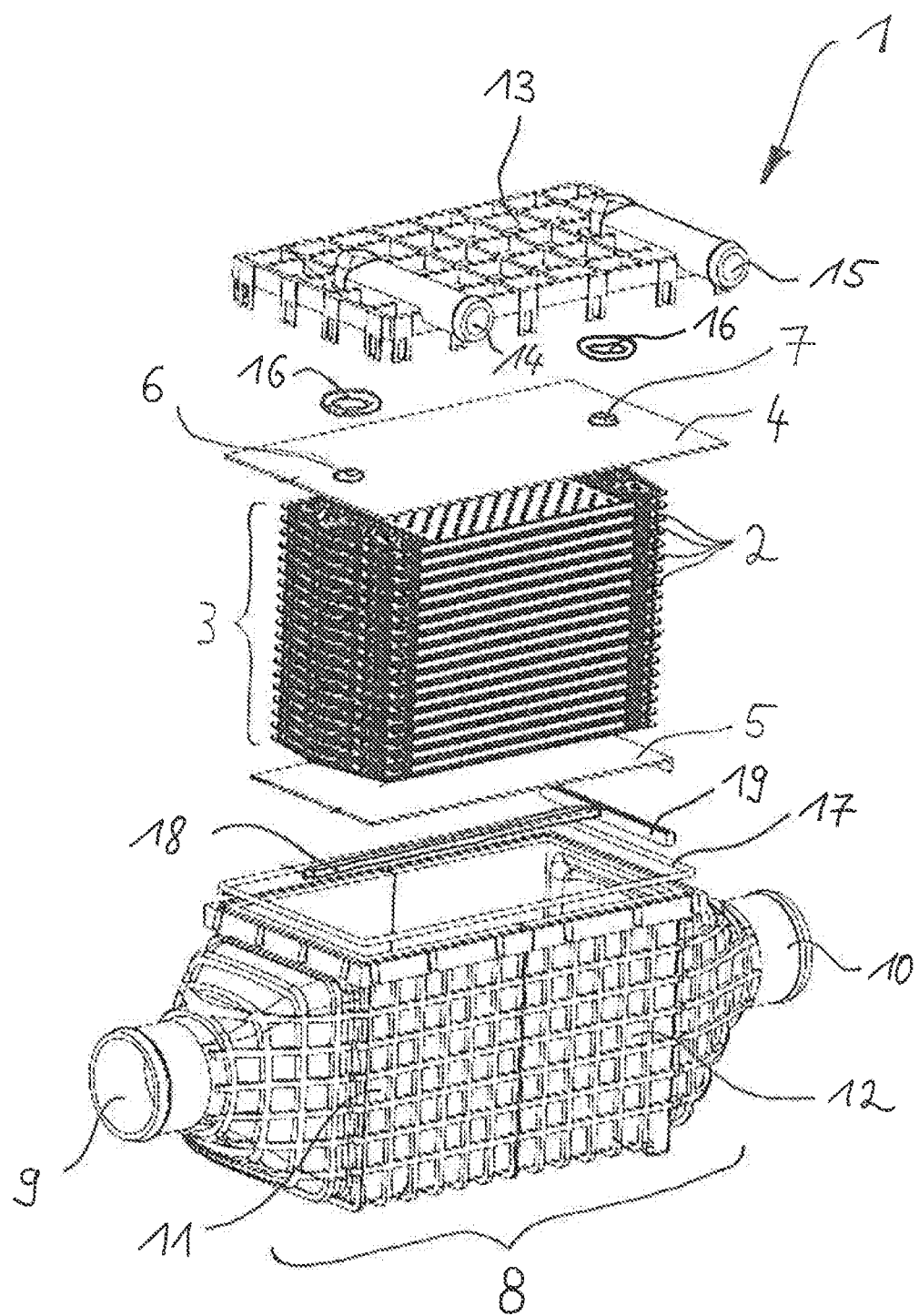

(51) Int. Cl.
*F02B 29/04* (2006.01)
*F28F 9/02* (2006.01)
*F28D 21/00* (2006.01)

(52) U.S. Cl.
CPC .......... *F28F 9/0246* (2013.01); *F28F 21/067* (2013.01); *F28D 2021/0082* (2013.01); *F28F 2225/02* (2013.01); *F28F 2230/00* (2013.01); *F28F 2275/08* (2013.01); *Y02T 10/12* (2013.01)

(56) References Cited

U.S. PATENT DOCUMENTS

| | | | | |
|---|---|---|---|---|
| 2007/0271910 | A1* | 11/2007 | Chanfreau | F02B 29/0418 60/320 |
| 2009/0014153 | A1 | 1/2009 | Pirnentel et al. | |
| 2011/0168366 | A1* | 7/2011 | Garret | F28D 9/0043 165/148 |
| 2012/0285423 | A1 | 11/2012 | Nguyen | |
| 2013/0213621 | A1* | 8/2013 | Pierre | F28F 3/08 165/166 |
| 2014/0299295 | A1* | 10/2014 | Kalbacher | F28F 9/26 165/76 |
| 2014/0345577 | A1 | 11/2014 | Meshenky et al. | |
| 2016/0097596 | A1* | 4/2016 | Stewart | F28D 1/0233 165/175 |
| 2016/0363391 | A1* | 12/2016 | Kim | F28F 9/002 |

FOREIGN PATENT DOCUMENTS

| | | | | |
|---|---|---|---|---|
| CN | 203231544 | U | 10/2013 | |
| CN | 203962140 | U | 11/2014 | |
| CN | 204007243 | U | 12/2014 | |
| CN | 104411211 | A | 3/2015 | |
| DE | 102005053924 | A1 | 5/2007 | |
| DE | 102013005796 | A1 | 10/2014 | |
| FR | 2886391 | A1 * | 12/2006 | ........... F28F 9/0075 |
| FR | 2967245 | A1 | 5/2012 | |
| GB | 2164738 | B | 3/1988 | |
| JP | 2002295988 | A * | 10/2002 | ........... F28D 9/0043 |
| JP | 2007-175617 | A | 7/2007 | |
| JP | 2009543994 | A | 12/2009 | |
| JP | 2015534030 | A | 11/2015 | |
| KR | 20130067099 | A | 6/2013 | |
| KR | 20130132542 | A | 12/2013 | |
| KR | 101526427 | B1 | 6/2015 | |
| KR | 20150125290 | A | 11/2015 | |
| WO | 2006/010463 | A1 | 2/2006 | |
| WO | 2006/125919 | A1 | 11/2006 | |
| WO | WO-2006125919 | A1 * | 11/2006 | ........... F02B 29/0462 |

OTHER PUBLICATIONS

German Office Action dated Sep. 2, 2016; Appln. No. 102016100305.0.
Japanese Office Action dated Mar. 12, 2019; Appln. No. 2018-516065.
Korean Office Action dated Jul. 25, 2017; Appln. 10-2016-0075704.
Chinese Office Action dated Jan. 13, 2020; Application No. 201780003274.8.
Chinese Office Action dated Dec. 1, 2020; Application No. 201780003274.8.

* cited by examiner

SUPERCHARGED AIR COOLING APPARATUS

CROSS REFERENCE TO RELATED APPLICATIONS

This application is a § 371 of International Application No. PCT/KR2017/000328 filed Jan. 10, 2017, and claims priority from German Patent Application No. 10 2016 100 305.0 filed Jan. 11, 2016.

The invention relates to a device for charge-air cooling comprised of a plate stack of several cooling plates with a first end plate and a second end plate, wherein the plate stack comprises a first connection port and a second connection port for a coolant and wherein the plate stack is disposed in a housing with an air inlet port and an air outlet port.

Such devices for cooling charge air, known as charge-air cooling in turbo engines, also referred to as charge air coolers, are for example utilized in motor vehicles to cool the air supplied to an engine. By supplying cooled air an increase in power and performance as well as efficiency of the engine can be attained.

To produce such a device for charge-air cooling, several metal plates, pressed together and spaced apart from each other, are joined to form a stack. This plate stack is provided with an input side and an output side connection port via which the connection to a coolant circulation takes place. The coolant flows through the tightly sealed plate stack and cools the plates and their immediate surroundings.

This plate stack is conventionally encompassed by a housing with a first connection port for supplying the charge air for an engine and a second connection port for the outlet of the cooled charge air. The air supplied via the first connection port into the housing flows between the plates of the plate stack and during its throughflow is cooled before it leaves the housing via the second connection port in the direction toward the engine.

In such charge-air coolers the problem most frequently encountered is that the connection ports for connecting the plate stacks must be brought out of the airtight housing. Separate sealing elements, for example, must be employed for this purpose. Especially given the stresses and strains to which a motor vehicle is subjected, such as temperature fluctuations and/or vibrations, problems develop at these transitions. Fracture formations and leakages are the consequence of these stresses and strains.

WO 2006125919 discloses a heat exchanger laid out as a plate heat exchanger and employed for example in a motor vehicle as charge-air cooler for an internal combustion engine. The heat exchanger comprises a plate stack, composed of several individual plates, with a first and a second connection port, wherein the plate stack is connectable to a coolant circuit by means of the connection ports. Disclosed is furthermore that the plate stack is placed in a housing of the heat exchanger and that the latter is sealed by means of an annular clamp and associated sealing in order for the circuit to be tightly closed for cooling the charge air.

Of disadvantage in this implementation with a partial or entire capping of the housing of the heat exchanger is that the connection ports of the coolant lines sealing elements must be inserted between the cappings and/or the plate stack of the heat exchanger. At such transitions of the coolant lines mechanical defects may occur.

Moreover, expenditures and complexities are relatively high in the production and assembly of such heat exchangers.

U.S. Pat. No. 8,695,574 discloses a charge-air cooler substantially encompassed by a housing. The publication has as its objective to provide a solution for the charge-air cooler to be especially well protected against vibrations. The solution provides that at least an elastic bearing member, such as for example a block of an elastic material such as rubber in the housing, braces the charge-air cooler against the housing. Vibrations, for example from an internal combustion engine, are hereby damped.

The disadvantage of this solution is the relatively large expenditure during the assembly as well as additionally necessary bearing materials as well as support or bracing elements.

The objective of the invention therefore is to specify a device for charge-air cooling which can be produced simply and cost-effectively and which ensures reliable functionality.

The objective is achieved with a subject matter with the characteristics according to patent claim 1 of the independent patent claims. Further developments are specified in the dependent patent claims 2 to 7.

The present invention provides that the housing of the device for charge-air cooling comprises at least four side parts and one floor part which are connected to one another. This housing, for example open on top, which can also be denoted as a partial housing, includes furthermore an air inlet port and an air outlet port which may be disposed oppositely. To close the housing a capping is provided which, in the manner of a lid, completes and closes off the housing.

To eliminate the problems entailed in prior art involving the connection ports of the plate stack, which are brought out through the capping or a side wall of the housing, the invention provides implementing the capping to include an integrated inflow and outflow. The inflow and also the outflow are consequently worked into the capping and are comprised of the same material as the capping.

The connection of inflow and outflow with an input side and output side connection port of the plate stack is carried out by emplacing the capping prepared in this manner onto the plate stack. In doing so, the ports at the plate stack, such as an input-side first and an output-side second connection port are brought into congruence with the ports of the inflow as well as of the outflow formed on the underside of the capping and sealed off by means of a sealing.

This process of emplacing the capping onto the plate stack is carried out after the plate stack has been set into the housing and been oriented appropriately. Auxiliary or positioning means known in prior art can be utilized for this purpose.

It is of advantage for the housing to be assembled of a first housing element and a second housing element. The production process of the housing elements can in this manner be simple, for example by using an injection molding process. Simple adaptation is likewise feasible to different requirements, for example to requirements with respect to the alignment of the air inlet port opposite the air outlet port or to their dimensioning. For example, the first housing element can be retained and be combined with a second housing element with a divergent alignment of its air outlet port to form a new product variant. The two housing elements are preferably joined by means of a plastic welding method. Alternatively, threaded fastenings or compression couplings can also be provided.

To realize a functional and tightly sealed connection of the capping with the plate stack, the invention provides disposing the first connection port and the second connection port of the plate stack at a first end plate, for example on the top side of the plate stack. Therewith is ensured that the coolant supplied to the device via the inflow for charge-air cooling can flow into the plate stack and subsequently flow out of it through the outflow.

For the coolant not to escape during the inflow or outflow, sealings are provided which are disposed between the first connection port in the first end plate of the plate stack and the inflow in the capping as well as between the second connection port and the outflow.

Since the air to be cooled by the device is most often precompressed, and thus has an increased pressure value compared to normal air pressure, it is necessary to close tightly the unit comprised of housing and capping in order to exclude pressure losses. For this purpose the invention provides disposing further sealings between the housing and the capping.

In the production of a device for charge-air cooling according to the invention the plate stack is set into this housing subsequent to the assembly or welding-together of the two housing halves. To align and secure the plate stack, one or more positioning means are provided. Such means can for example be inserted between the floor of the housing and the second end plate of the plate stack, thus underneath the plate stack set into the housing.

Such a positioning means can be produced of an elastically deformable synthetic, foam or the like. When placing the capping onto the housing and the plate stack, such stack is pressed downwardly against the positioning means which is plastically deformed under the exerted pressure.

In this way it is ensured that the plate stack is securely fixed in the housing even when exposed to shocks or vibrations. Installation under pressure of the plate stack into the housing, moreover, yields a sufficiently high pressure to reliably and securely seal off the sealings in the proximity of the first connection port of the plate stack and the inflow or second connection port and the outflow.

The invention provides that the capping is set onto the housing and securely connected with it. For this purpose the invention provides that latchings are affixed on the capping. For example, first latching parts can be attached at fixed distances at fixed distances peripherally about the capping. Additionally, second latching parts can also be disposed peripherally on the upper edge of the housing. When setting the capping onto the housing, the first latching parts subsequently snap into the second latching parts and keep the housing securely closed.

Such latching parts can be implemented such that they allow, for example, opening for repair or maintenance work. There is consequently the capability of access to the device, for example in order to exchange the plate stack or replace a defective sealing.

Alternatively, there is the provision to establish the connection between the capping and the housing by means of threaded fasteners or rivets. For this purpose, appropriate receptions are provided in the capping, such as, for example, bores for bolts. A corresponding threaded counterpart into which a bolt can be threaded is conventionally provided in the upper region of the housing.

Connecting the capping with the housing can also be accomplished by adhering or welding the structural parts together. For this purpose a synthetic adhesive or a synthetic welding method is utilized.

To increase the strength and stability of the device, in particular of a housing and/or of a capping produced of synthetic material, metal structures are provided that are applied onto these structural parts or inserted into the material. In the vehicle construction industry, for example for reasons of weight, use of aluminum is preferred. This strengthening of the structures lends robustness to the structural parts of the device against high temperature fluctuations, vibrations and changing pressures.

The invention consequently provides a simple and economically producible device for charge-air cooling with which variable adaptation to different engine bay environments is enabled.

Figure 2:
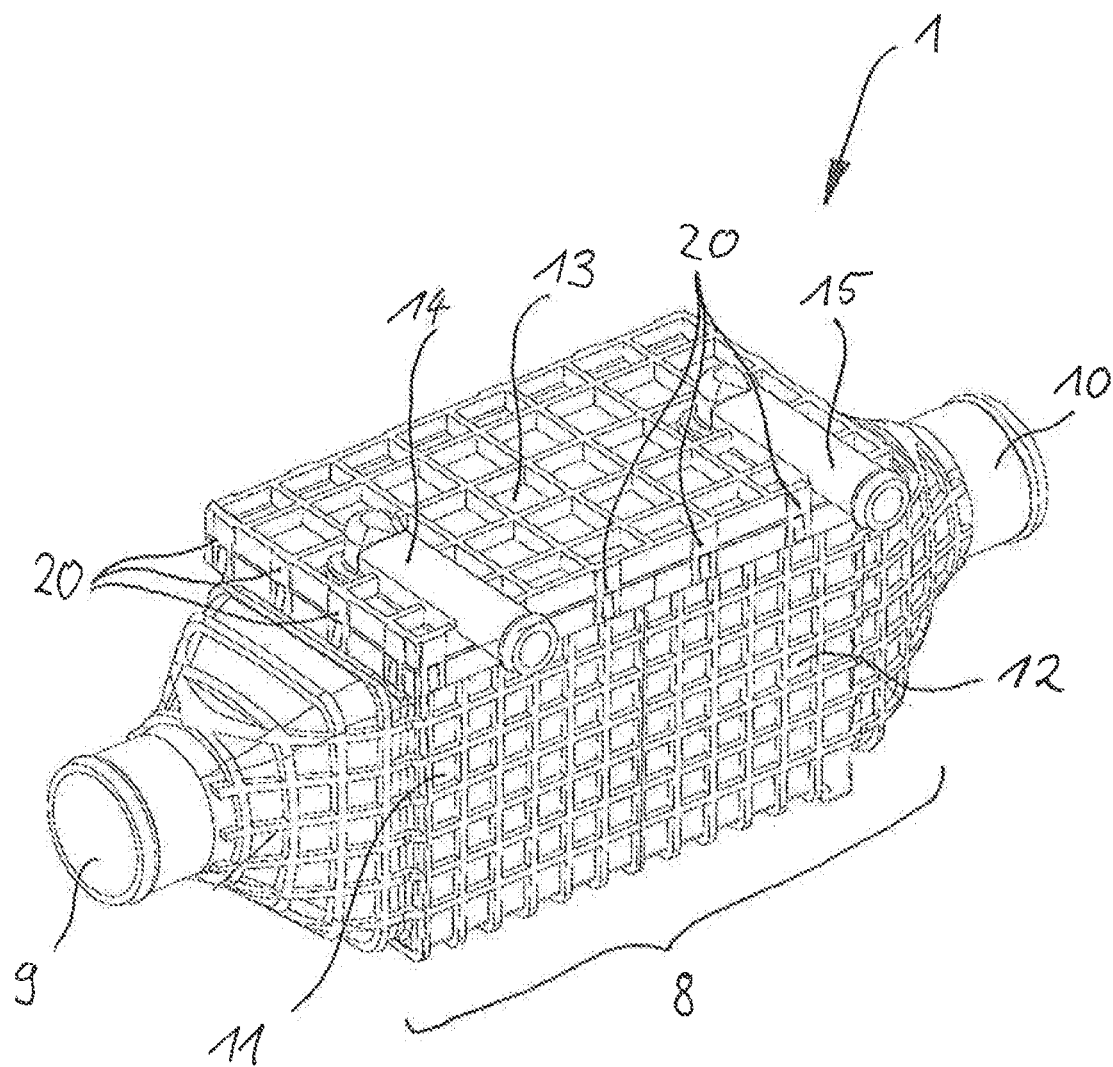
Figure 3:
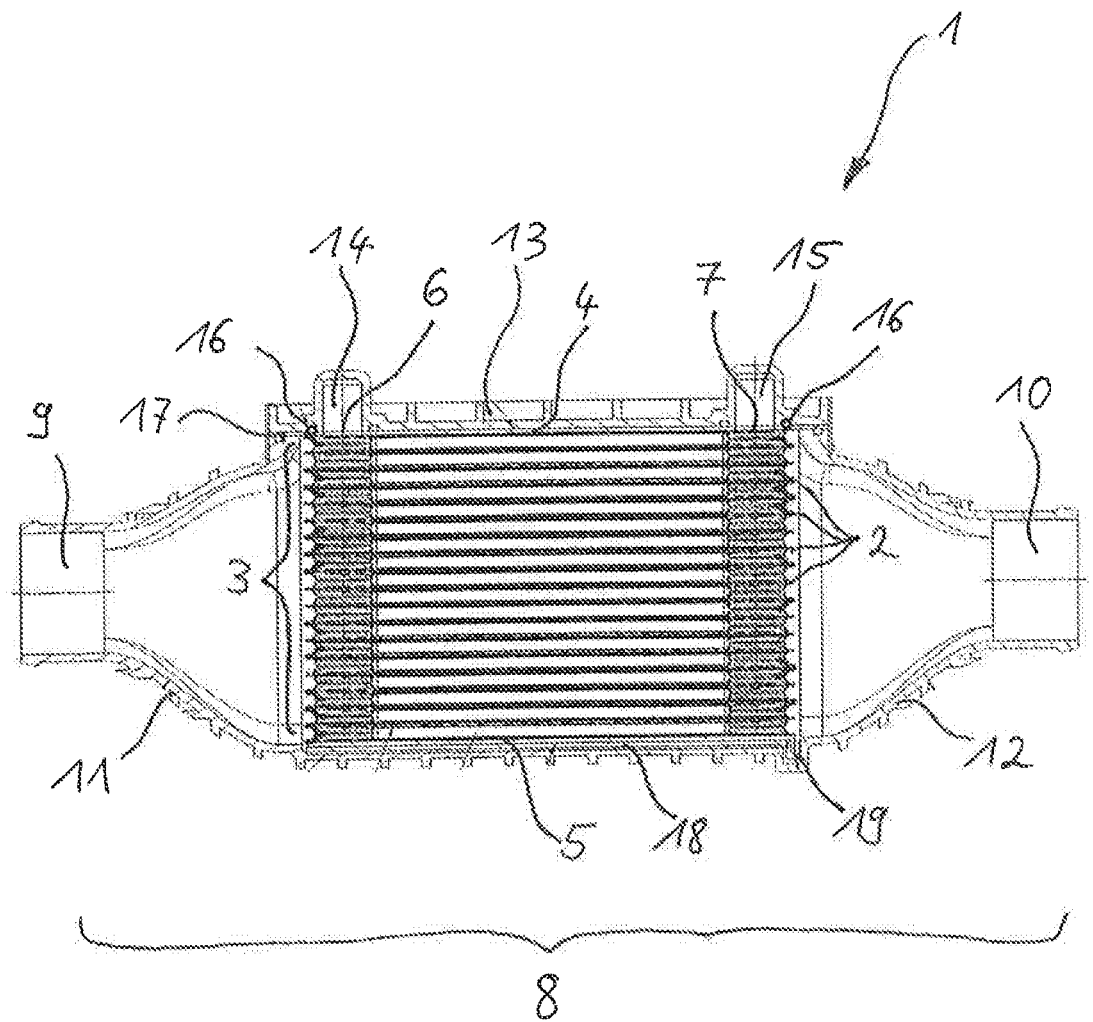
Figure 4:
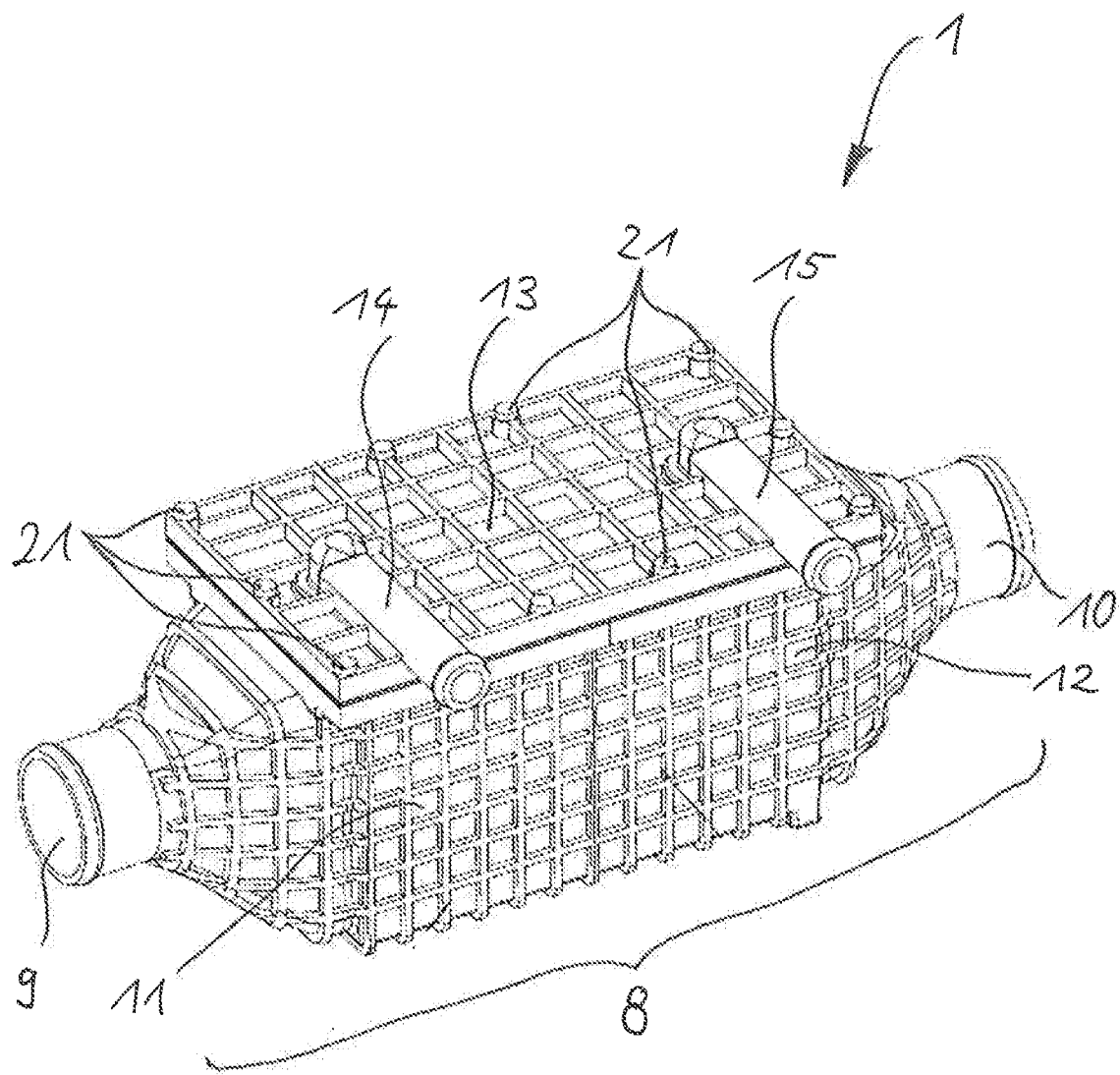
Figure 5:
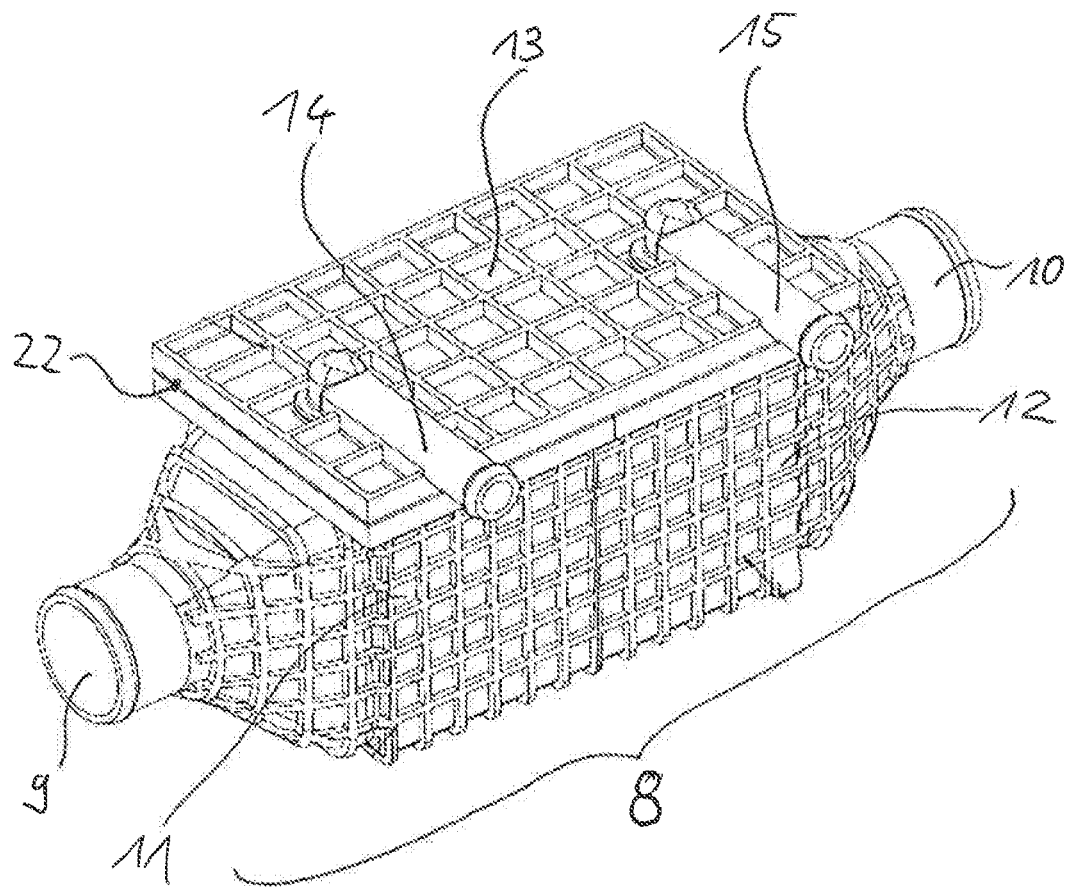
Figure 6:
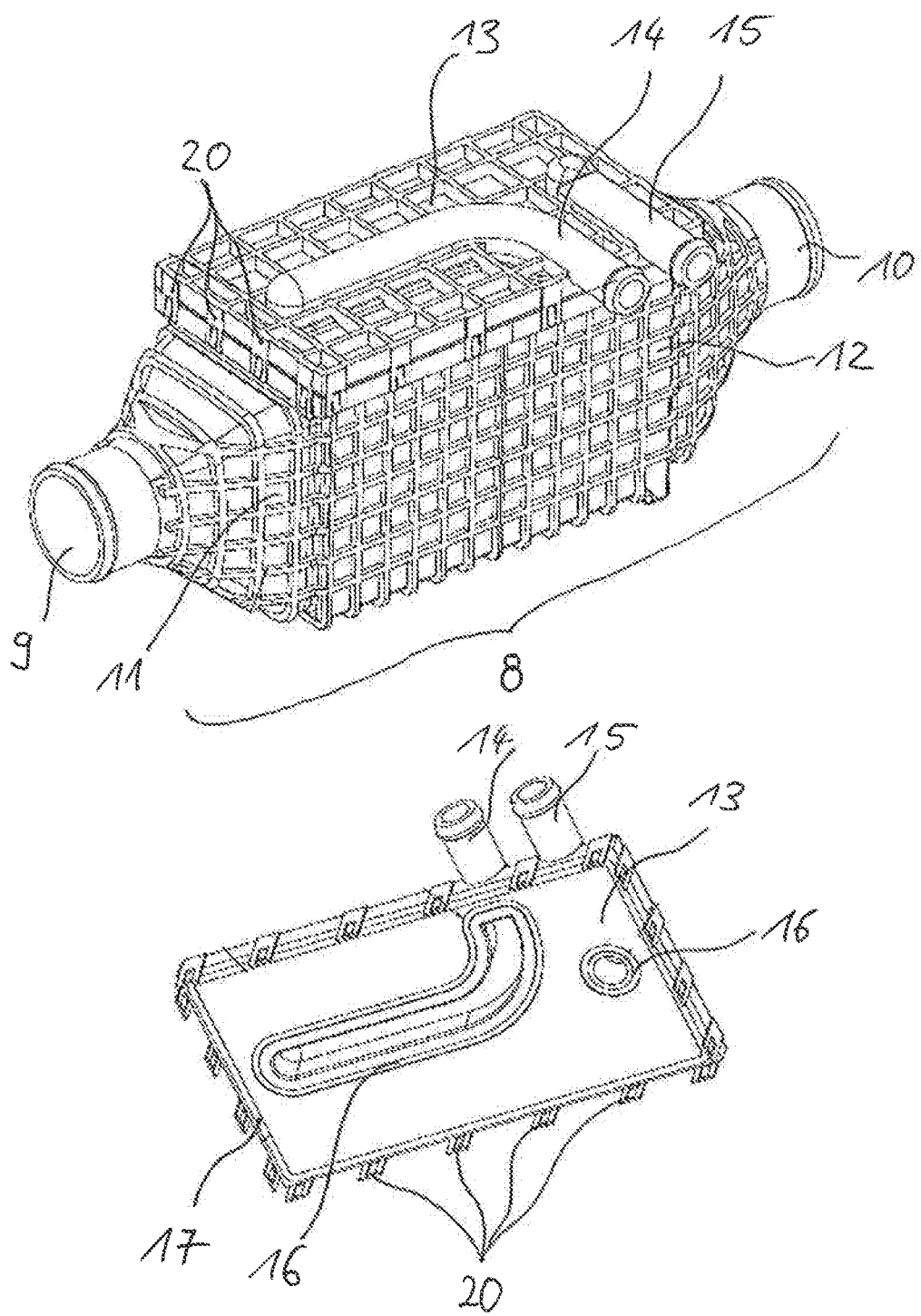

Further details, characteristics and advantages of implementations of the invention are evident in the following description of embodiment examples with reference to the associated drawing. Therein depict:

FIG. 1 a device for charge-air cooling according to the invention in exploded view, FIG. 2 a device according to the invention in a first assembled variant, FIG. 3 a device according to the invention in sectional view, FIG. 4 a device according to the invention in a second assembled variant, FIG. 5 a device according to the invention in a third assembled variant, FIG. 6 a device according to the invention according to the first assembled variant with a variation of the connection ports for the coolant circuit.

In FIG. 1 is shown a device 1 according to the invention for charge-air cooling in exploded representation with its constituents. A plate stack 3 constructed of several cooling plates 2 comprises on its upper side a first end plate 4 and on its underside a second end plate 5. The first end plate 4 includes a first connection port 6 and a second connection port 7, via which a coolant, such as water, flows into the plate stack 3 or out of it.

The plate stack 3, the first end plate 4 and the second end plate 5 are joined to form a structural unit. This unit is inserted into a housing 8 with an air inlet port 9 and an air outlet port 10 such that the unit rests with the second end plate 5 on the floor of the housing 8.

It is of advantage to produce the housing 8 in two parts, a first housing element 11 and a second housing element 12 since such parts can be produced technologically simpler when, as in the invention, synthetic material can be used. The housing elements 11 and 12, produced for example using an injection molding method, are nondetachably connected with one another by means of synthetic welding.

The housing 8 comprised of four side parts and one floor part is closed off by placing a capping 13 onto it. It is provided according to the present invention that an inflow 14 and an outflow 15 are integrated into the capping 13. This can be achieved thereby that the capping 13 is an integral part fabricated, for example, of a synthetic material. For the production of the capping 13 an injection molding process can also be employed.

The assembly of the device for charge-air cooling takes place in that between the first connection port 6 and the inflow 14 as well as between the second connection port 7 and the outflow 15 in each instance a first sealing gasket 16 is disposed.

The device 1 is connected across the inflow 14 and the outflow 15 for example to a coolant circuit of a motor vehicle. The result of using the first sealing gaskets 16 is that no coolant can leak from the closed circuit and penetrate into the housing 8.

The depiction of the first and second connection port 6 and 7 as well as of inflow 14 and outflow 15 in FIG. 1 are exemplary and can also be interchanged. There is also no restriction regarding the alignment and spacing of inflow 14 and outflow 15 as depicted in FIG. 1, which will be shown further down.

In this embodiment of the device for charge-air cooling the connection ports of the plate stack 3 are not carried through the housing 8 and consequently the known problems with additional sealing means between the lead-throughs and the housing are overcome.

For a better seal of the housing 8, a second sealing gasket 17 is placed between the housing 8 and the capping 13.

To compensate for fabrication tolerances in the production of the plate stack 3, a first positioning means 18 is disposed between the housing floor of housing 8 and the second end plate 5. This positioning means 18, produced for example of a synthetic material, is compressed during the assembly and ensures sufficient pressure between the first end plate 4 and the capping 13, which ensures the mode of action of the first sealing gaskets 16.

An additional second positioning means 19 can, as shown, be placed into a U-shaped indentation in the floor of housing 8 and receive, for example, an angled portion of the second end plate 7.

In FIG. 2 is shown the device according to the invention in a first assembled variant. Depicted are the first housing element 11 and the second housing element 12 of housing 8 with the air inlet port 9 as well as the air outlet port 10. The capping 13 with integrated inflow 14 and outflow 15 is placed on the housing 8. The securement of the capping 13 with the housing 8 is, for example, achieved via the latchings 20 depicted in FIG. 2. These are applied peripherally about the capping 13 and ensure the secure connection between the capping 13 and the housing 8 and therewith, with the aid of the second sealing gasket 17 not shown in FIG. 2, the leak tightness of the device.

The device according to the invention is shown in FIG. 3 in sectional view. The section is a longitudinal section in the center of the device for charge-air cooling. Depicted is the structural unit evident already in FIG. 1 comprised of the plate stack 3 of several cooling plates 2, with the first end plate 4 and the second end plate 5.

This unit is disposed in housing 8 comprised of the first housing element 11 and the second housing element 12. On the left side of the device 1, for example, is disposed the air inlet port 9 and on the right the air outlet port 10. The air to be cooled enters via the air inlet port 9 the device 1 and flows between the cooling plates 1 of the plate stack 3 whereby it is cooled and leaves the device 1 via the air outlet port 10 across which the air is conducted to an internal combustion engine.

To ensure the leak tightness of the separate circuits, the first sealing gaskets 16 is applied for the coolant circuit and the second sealing gasket 17 is applied for the charge-air circuit.

The coolant is conducted across the inflow 14 and the first connection port 6 into the plate stack 3. In this stack the coolant flows through the cooling plates 2 disposed parallel to one another and leaves the plate stack 3 across the second connection port 7 and the outflow 15.

The positioning means 18 and 19 are evident underneath the plate stack 3 in the region of the floor of housing 8.

FIG. 4 shows the device according to the invention in a second assembled variant. This depiction corresponds substantially to FIG. 2 as has been described in detail above. The difference between FIG. 4 and FIG. 2 is the type of connection of capping 13 with the housing 8. In this embodiment shown threaded fasteners 21 are utilized which are peripherally disposed about the capping 13.

In FIG. 5 is shown the device according to the invention in a third assembled variant. In this embodiment no connection elements are distinguishable since the connection has been carried out by means of an adhesive 22 using an adhesion process. Alternatively, a welding process can also be employed.

FIG. 6 shows the device according to the invention according to the first assembled variant with a variation of connection ports 14 and 15 for the coolant circuit. The present invention enables a simple adaptation of the device 1 for charge-air cooling to various requirements with respect to flexibility and adaptation to different motor vehicle or engine bay environments. Only by adaptation of the capping 13 can this flexibility be achieved. As is, for example, depicted in FIG. 6, the spacing between inflow 14 and outflow 15 can be minimally modified. These modification capabilities refer not only to the spacing but also to the directions of the connection ports that are both variable.

With such modifications it may also be necessary to adapt, for example, the first sealing gasket 16 to a changed course of the transition to the first connection port 6 and/or to the second connection port 7, as is shown in the bottom depiction of FIG. 6. The remaining components of device 1 can be retained unchanged.

LIST OF REFERENCE NUMBERS

1 Device for charge-air cooling
2 Cooling plate
3 Plate stack
4 First end plate
5 Second end plate
6 First connection port
7 Second connection port
8 Housing
9 Air inlet port
10 Air outlet port
11 First housing element
12 Second housing element
13 Capping
14 Inflow
15 Outflow
16 First sealing gasket
17 Second sealing gasket
18 First positioning means
19 Second positioning means
20 Latching
21 Threaded fastener
22 Adhesive

The invention claimed is:
1. A device for charge-air cooling comprising:
a housing having four side parts, one floor part, an air inlet port, and an air outlet port;
a plate stack having several cooling plates, a first end plate and a second end plate, wherein the plate stack further has a first connection port and a second connection port for a coolant, wherein the plate stack is disposed in the housing, and wherein the first connection port and the second connection port are disposed in the first end plate; and
a capping covering the first end plate and sealing the coolant, wherein an inflow and an outflow are disposed in the capping,
wherein each of a pair of first sealing gaskets is disposed between the first connection port and the inflow and between the second connection port and the outflow, wherein a second sealing gasket is disposed between the housing and the first end plate, wherein the pair of first sealing gaskets are disposed above the first end plate and the second sealing gasket is disposed below the first end plate, wherein the first end plate covers the housing and seals precompressed air to be cooled, wherein a first positioner is disposed between the one floor part and the second end plate, and wherein the first positioner is compressed between the one floor part and the second end plate, thereby pressing the first end plate to the capping, so that the pair of first sealing gaskets are compressed between the first end plate and the capping.

2. A device for charge-air cooling comprising:

a housing having four side parts, one floor part, an air inlet port, and an air outlet port;

a plate stack having several cooling plates, a first end plate and a second end plate, wherein the plate stack further has a first connection port and a second connection port for a coolant, and wherein the plate stack is disposed in the housing; and a capping covering the first end plate, wherein an inflow and an outflow are disposed in the capping, wherein each of a pair of first sealing gaskets is disposed between the first connection port and the inflow and also between the second connection port and the outflow, wherein a second sealing gasket is disposed between the housing and the first end plate, wherein the at least one of the pair of first sealing gaskets surrounds the entire path of one of the inflow and outflow paths disposed in the capping, wherein a first positioning means is disposed between the one floor part and the second end plate, and wherein the first positioning means is compressed between the one floor part and the second end plate, thereby pressing the first end plate to the capping, so that the pair of first sealing gaskets are compressed between the first end plate and the capping.

3. A device for charge-air cooling comprising:

a housing having four side parts, one floor part, an air inlet port, and an air outlet port;

a plate stack having several cooling plates, a first end plate and a second end plate, and wherein the plate stack further has a first connection port and a second connection port for a coolant, and wherein the plate stack being disposed in the housing;

a capping covering the first end plate, wherein an inflow and an outflow are disposed in the capping, wherein each of a pair of first sealing gaskets is disposed between the first connection port and the inflow and also between the second connection port and the outflow, wherein a second sealing gasket is disposed between the housing and the first end plate, wherein a first positioning means is disposed between the one floor part and the second end plate, and wherein the first positioning means is compressed between the one floor part and the second end plate, thereby pressing the first end plate to the capping, so that the pair of first sealing gaskets are compressed between the first end plate and the capping.

4. A device according to claim 1, wherein one of the inflow and outflow is disposed in "L" shape in the capping while the other of the inflow and outflow is disposed along a straight line of axis in the capping.

5. A device according to claim 2, wherein one of the inflow and outflow is disposed in "L" shape in the capping while the other of the inflow and outflow is disposed along a straight line of axis in the capping.

6. A device according to claim 3, wherein one of the inflow and outflow is disposed in "L" shape in the capping while the other of the inflow and outflow is disposed along a straight line of axis in the capping.

7. A device according to claim 1, wherein a second positioner is disposed between the one floor part and the second end plate.

8. A device according to claim 2, wherein a second positioner is disposed between the one floor part and the second end plate.

9. A device according to claim 3, wherein a second positioner is disposed between the one floor part and the second end plate.

* * * * *